United States Patent
Overbeek

(10) Patent No.: US 6,305,271 B1
(45) Date of Patent: Oct. 23, 2001

(54) STEAM PEELING DEVICE

(75) Inventor: Marcellinus Franciscus Maria Overbeek, Schoonhoven (NL)

(73) Assignee: Kiremko B.V., Montfoort (NL)

( * ) Notice: Subject to any disclaimer, the term of this patent is extended or adjusted under 35 U.S.C. 154(b) by 0 days.

(21) Appl. No.: 09/668,745

(22) Filed: Sep. 25, 2000

(30) Foreign Application Priority Data

Oct. 5, 1999 (NL) .................................................. 1013219

(51) Int. Cl.$^7$ ................................. A23N 7/00; A23N 7/02
(52) U.S. Cl. ................. 99/348; 99/467; 99/479; 99/516; 99/483; 99/584
(58) Field of Search ............................. 99/348, 410, 356, 99/359, 583, 584, 467–471, 474, 516, 539, 540, 483, 629–634, 644, 479; 426/482; 366/102, 103, 105, 101, 220, 314; 126/369, 20; 134/134, 153

(56) References Cited

U.S. PATENT DOCUMENTS

| 4,064,794 | * | 12/1977 | Kunz | 99/474 |
| 4,091,722 | * | 5/1978 | Kunz | 99/479 |
| 4,188,869 | * | 2/1980 | Komen | 99/584 |
| 4,222,322 | * | 9/1980 | Van Der Schoot | 99/467 |
| 4,393,756 | * | 7/1983 | Van Der Schoot | 99/348 |
| 4,430,925 | * | 2/1984 | Kunz | 99/330 |
| 4,566,375 | * | 1/1986 | Van Der Schoot | 99/348 |
| 4,632,025 | * | 12/1986 | Van Der Schoot | 99/348 |

FOREIGN PATENT DOCUMENTS

| 0 078 587 | 5/1983 | (EP) . |
| 0 146 153 | 6/1985 | (EP) . |
| 0 182 434 | 5/1986 | (EP) . |
| 2 668 336 | 4/1992 | (FR) . |

* cited by examiner

Primary Examiner—Timothy F. Simone
(74) Attorney, Agent, or Firm—Oblon, Spivak, McClelland, Maier & Neustadt, P.C.

(57) ABSTRACT

The invention relates to a steam peeling device comprising a vessel provided with a closable opening near one end for introducing and removing products to be processed. The opposite end of the vessel is closed by an end wall. A device for supplying steam to the vessel are furthermore provided. The vessel is rotatable about an at least substantially horizontal axis of rotation, which is positioned between the two ends of the vessel and which extends transversely to the longitudinal axis of the elongated vessel. A perforated jacket surrounding the receiving space all round is disposed within the vessel, spaced from the wall thereof by a short distance. A supply pipe for steam opens into the space present between the wall of the vessel and the jacket.

20 Claims, 3 Drawing Sheets

STEAM PEELING DEVICE

BACKGROUND OF THE INVENTION

1. Field of the Invention

The invention relates to a steam peeling device comprising a vessel provided with a closable opening near one end for introducing and removing products to be processed, wherein the opposite end of the vessel is closed by an end wall, and means for supplying steam to the vessel, wherein the vessel can be rotatably driven about an at least substantially horizontal axis of rotation, which is positioned between the two ends of the vessel and which extends transversely to the longitudinal axis of the elongated vessel.

2. Description of the Prior Art

In a steam peeling device as for example known from EU-A-0 146 153, the steam is supplied via a basket formed by grid bars, which is centrally disposed in the vessel, wherein the steam enters the interior of the vessel over a comparatively small area so as to come into contact with the products that surround the basket at least partially.

A further steam peeling device known from EU-A-0 078 587 comprises a steam supply channel which extends in a U shape along he inner wall of the vessel, wherein the wall of said channel that faces towards the interior of the vessel is perforated. Also in this known construction the steam enters the interior of the vessel over a comparatively small area.

SUMMARY OF THE INVENTION

According to the invention a perforated jacket surrounding the receiving space all round is disposed within the vessel, spaced from the wall thereof by a short distance, and a supply pipe for steam opens into the space present between the wall of the vessel and the jacket.

The steam that is supplied to the interior of the vessel is thereby distributed over the largest possible area, as a result of which a quicker and better influence of the steam on the products can be obtained than with the conventional construction.

Efficiently, a partition plate which is fixed to the inner wall of the vessel is disposed in the vessel, between the end of the vessel comprising the end wall and the substantially horizontal axis of rotation, in the central portion of which partition plate a passage is formed, whilst means for removing condensate are provided, which means communicate with the space between the end wall and the partition plate, wherein the device includes a valve mechanism, which shuts off the passage in the central portion in a first position and which releases said passage in a second position so as to place the space between the end wall and the partition plate into open communication with the other part of the interior of the vessel.

While the products are being steamed, the valve mechanism will occupy the position in which the space between the end wall and the partition plate is in open communication with the other part of the interior of the vessel, so that condensate can flow into said space. The passage will be shut off before steam is blown off, so that the risk of condensate being carried along with the steam exiting from said space is eliminated.

BRIEF DESCRIPTION OF THE DRAWINGS

The invention will now be explained in more detail by means of an embodiment of a steam peeling device according to the invention which is schematically illustrated in the accompanying figures.

DESCRIPTION OF THE PREFERRED EMBODIMENTS

Figure 1:
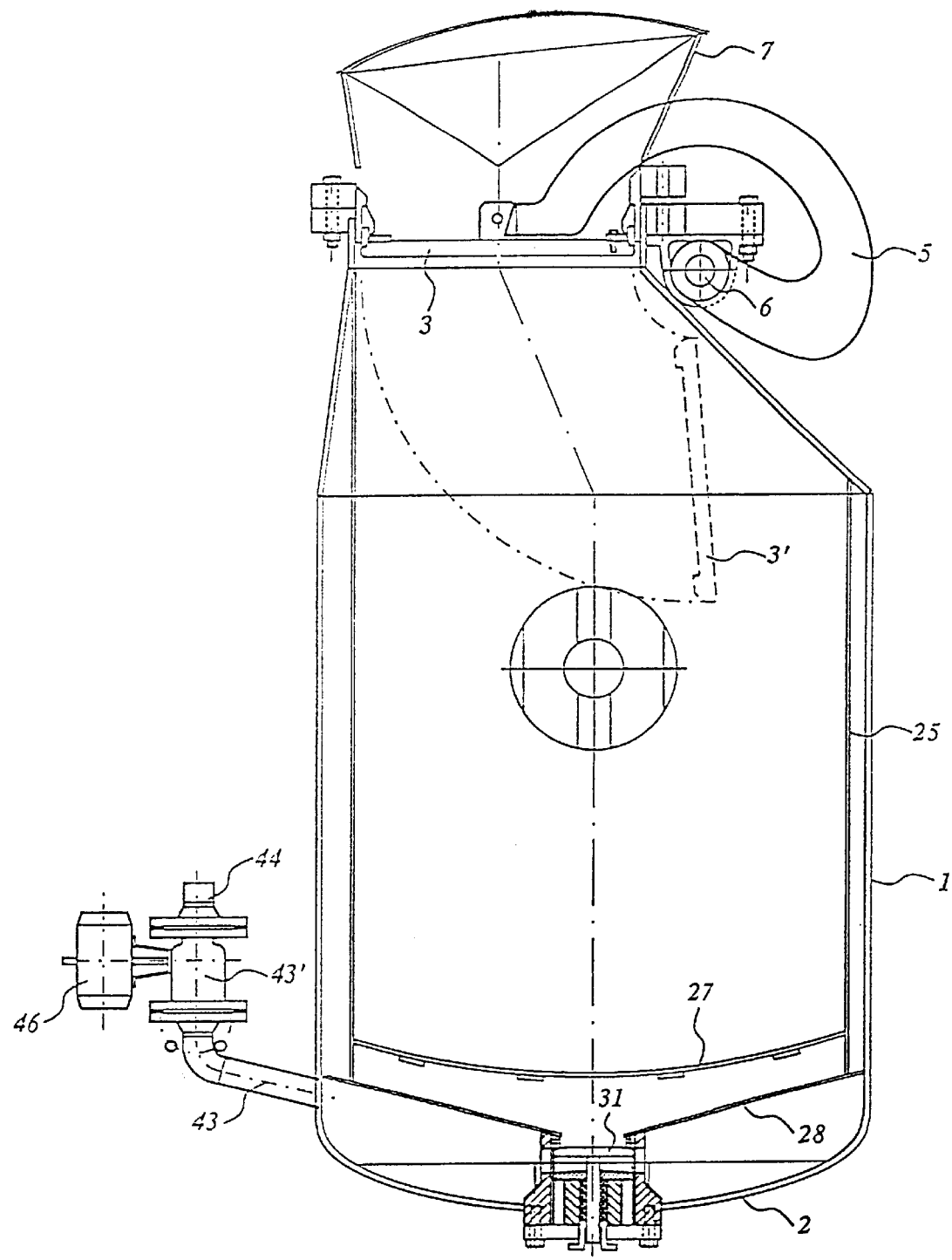
FIG. 1 is a schematic cross-sectional view of a steam peeling device according to the invention.

The steam peeler comprises a more or less elongated vessel 1, which is closed by an end wall 2 near one end.

Near the other end of the vessel an opening is provided, which can be closed by means of a cover 3. Cover 3 is to that end connected to an arm 5, which can be pivoted about a pivot pin 6 by adjusting means so as to pivot cover 3 from the position illustrated in full lines in FIG. 1, in which the cover closes the vessel, to the open position 3' of the cover, which is illustrated in dotted lines. In this open position products to be steamed, such as potatoes, can be deposited into the vessel via a filling hopper mounted on the end of the vessel.

Mounted on the outside of the vessel, on either side thereof, are co-axial journal members, by means of which vessel 1 can be rotatably supported in a frame (not shown), in such a manner that the vessel is rotatable by driving means (not shown) about an at least substantially horizontal axis of rotation, which is formed by co-axial central axes of the journal members, which axis of rotation crosses the central axis of the vessel perpendicularly between the ends of the vessel.

Figure 3:
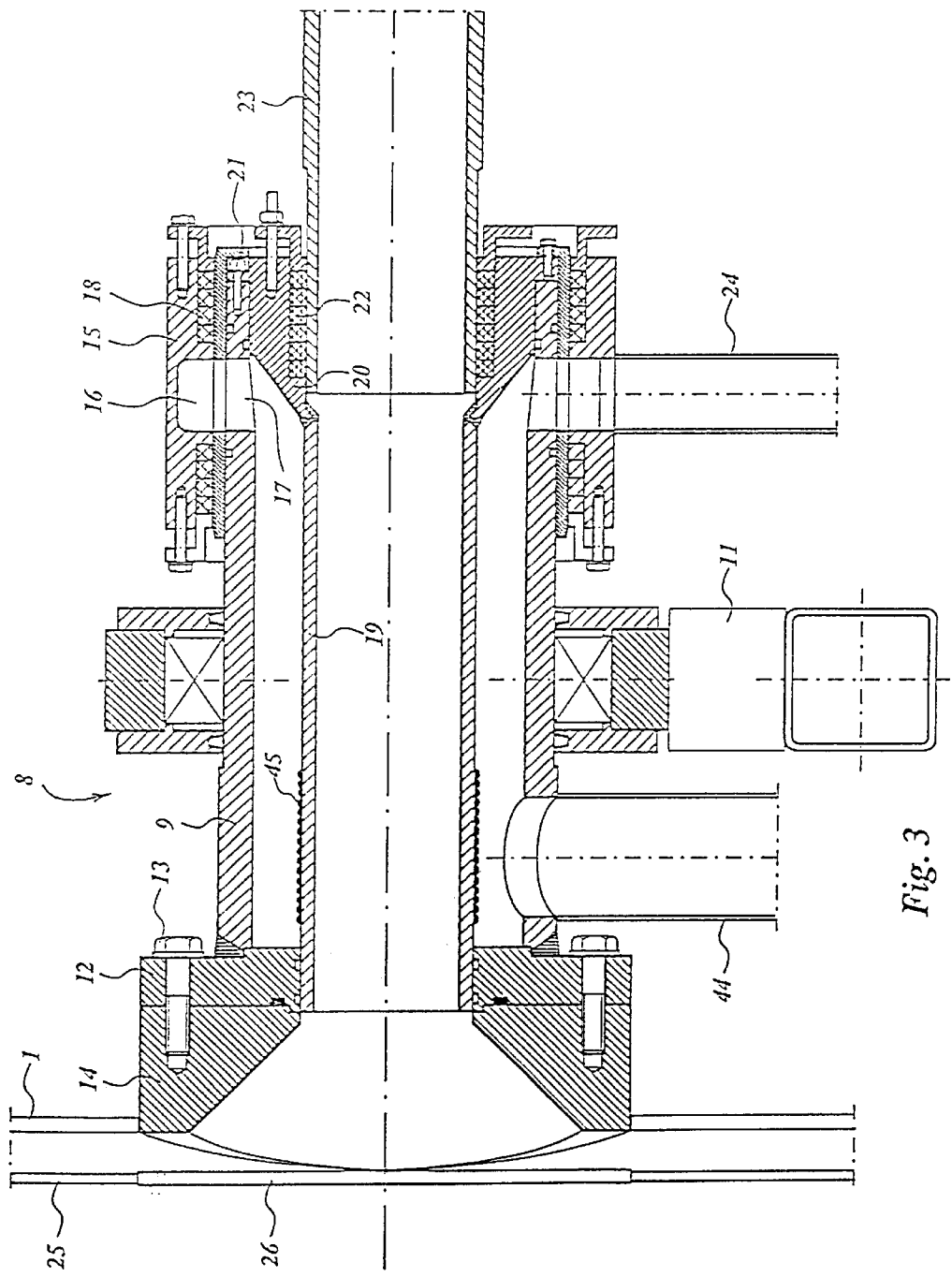
FIG. 3 is a larger-scale sectional view of a journal construction which is used for supplying and discharging steam and for discharging condensate.

One journal member may be a massive shaft, whilst the other journal member 8 is shown in sectional view in FIG. 3.

As is apparent from FIG. 3, the journal member comprises a hollow shaft 9, which is supported by means of a bearing 10 in a frame part 11 of the frame (not shown) that supports the vessel.

One end of the shaft 9 is attached to a flange 12. Flange 12 is attached by means of bolts 13 to a flange 14, which is welded on the wall of vessel 1. The other end of shaft 9 is rotatably journalled in an annular member 15 surrounding shaft 9, in which a circular chamber 16 is recessed, which is in commutation with the interior of hollow shaft 9 via holes 17 formed in hollow shaft 9. Packing means 18 and the like are provided so as to prevent leakage between hollow shaft 9 and annular member 15.

A pipe 19, which is concentrically surrounded by hollow shaft 9, is inserted with one end into a hole formed in flange 12 and connected with its other end to an annular supporting member 20, which is disposed in the opposite end of the hollow shaft 9 and which is fixed to shaft 9 by means of bolts 21.

The end of a pipe 23 is inserted into said annular supporting member with the interposition of sealing member 22, all this in such a manner that the annular supporting member 20 is rotatable with respect to pipe 23.

As is furthermore apparent from FIG. 3, a pipe 24 is connected to annular space 16.

Present in the interior of the vessel, spaced from the inner wall of vessel 1 by a short distance, is a perforated jacket 25 which is surrounded by the vessel all round.

Near the passage formed in flange 14, a closed buffer plate 26 is disposed in said perforated jacket, against which steam supplied via pipes 23 and 19 during operation will impinge, which steam will subsequently flow into the space between the perforated jacket and the inner wall of the vessel, and from said space, through the perforated jacket, into the interior of the vessel.

Seen in the position of the vessel as shown in FIG. 1, a grid 27 is disposed near the bottom side of the vessel, on which grid products supplied via hopper 7 will be received.

Disposed some distance below said grid 27 and some distance above end wall 2 is a partition plate 28 in the form of a conical surface, which extends from its circumferential edge attached to the inner wall of the vessel in the direction of end wall 2.

A hole or passage 28' is formed in the centre of the partition plate. Attached to the boundary edge of the passage is the end of an annular supporting member 29, which is attached with its other end to the boundary edge of a hole formed in end wall 2. Near partition plate 28 a valve seat 30 is supported by annular supporting member 29. A valve 31 can mate with said valve seat 30 for the purpose of shutting off passage 28'. Valve 31 is mounted on a valve rod 32, which is connected with its end remote from the valve to a driving element 33, for example a setting cylinder, by means of which valve rod 32 can be moved in its longitudinal direction.

Valve rod 32 is journalled, with the interposition of sealing member 34, in a supporting housing 35 which is fixed by means of bolts 36 to the supporting member 29 that is disposed between end wall 2 and partition plate 28. Present in housing 35 and in supporting member 29 are passages 37 and 37', respectively, which passages are in open communication with the space 38 that is present between partition plate 28 and bottom plate 2.

Figure 2:
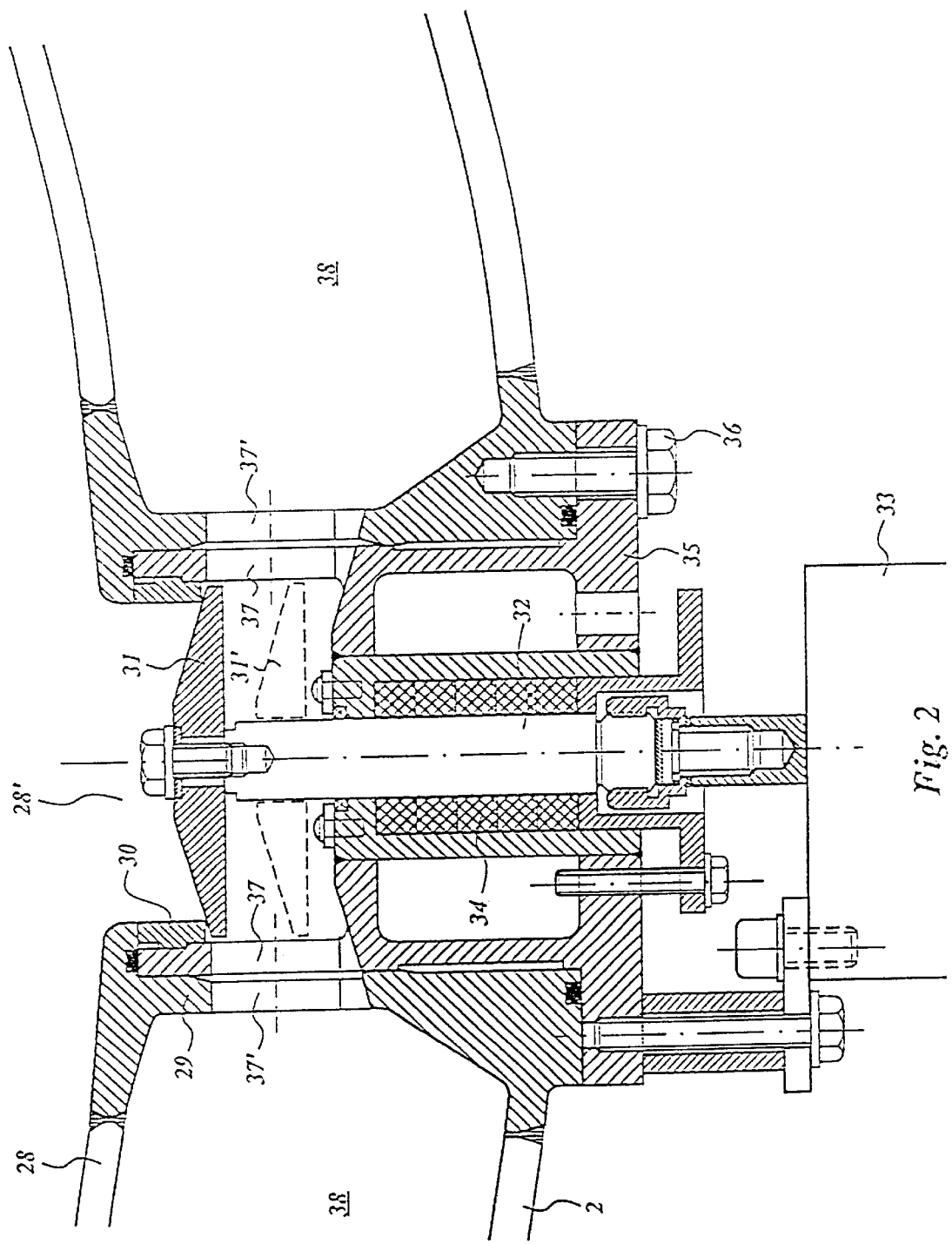
FIG. 2 is a larger-scale sectional view of a valve mechanism.

It will be apparent that in the position of valve 31 that is shown in FIG. 2, in which position valve 31 abuts against valve seat 30, space 38 is shut off from the interior space in vessel 1. When the valve rod 32 is moved in its longitudinal direction by means of driving element 33, however, the valve can be moved to the position 31' that is illustrated in dotted lines in the figure, in which position the interior of the vessel is in open communication with space 38 via passages 37 and 37'.

Connected to space 38 is a discharge pipe 43 (FIG. 1), which communicates with one end of a pipe 44 via a shut-off valve 43'. The other end of pipe 44 is connected to the interior of hollow shaft 9 (FIG. 3) near flange 13. Near this connection pipe 19, which is surrounded by hollow shaft 9, includes a welded-on strengthening layer 45 on its outer circumference, which strengthening layer functions to prevent the pipe 19 from being attacked by condensate flowing from pipe 44.

Shut-off valve 43 can be opened and closed by means of a driving element 46 mounted on shut-off valve 43.

The operation of the above-described device is as follows.

In the upright position of the device as shown in FIG. 1, products to be steamed, such as potatoes, can be introduced into the interior of the vessel after the cover 3 has been opened. After cover 3 has been closed, steam can be introduced into the vessel via pipes 23 and 19.

The steam that comes into contact with the initially cold products and the cold inner wall of the vessel and the jacket will at least partially condensate, and it can flow into space 38 via the valve 31, which is open as illustrated in dotted lines.

During operation the vessel will be rotated about the horizontal axis of rotation formed by journal member 8 and the journal member that is disposed on the opposite side of the vessel, whereby the product, such as potatoes, will come into contact with steam on all sides for the purpose of steaming off the peel.

As already said before, a very uniform distribution of the steam over a large area takes place thereby, in that the steam present in the interior of the vessel exits via the perforated jacket 25 disposed within the vessel, which surrounds the products present in the vessel all round.

Once the products have been exposed to the steam sufficiently long, the supply of steam will be interrupted and valve 31 will be pressed against valve seat 30 so as to shut off the passage 28'. Once valve 31 is closed, valve 43' can be opened for the purpose of discharging the condensate via pipe 44, the interior of shaft 9 and pipe 24. The steam that is present in the vessel will be discharged via pipes 19 and 23.

Since valve 31 is closed while steam is being discharged from the vessel, condensate cannot be carried along by the exiting steam.

What is claimed as new and desired to be secured by Letters Patent of the United States is:

1. A steam peeling device comprising a vessel provided with a closable opening near one end for introducing and removing products to be processed into and from, respectively, a receiving space for the products in the vessel, wherein the opposite end of the vessel is closed by an end wall, and means for supplying steam to the vessel, wherein the vessel can be rotatably driven about an at least substantially horizontal axis of rotation, which is positioned between the two ends of the vessel and which extends transversely to the longitudinal axis of the elongated vessel, characterised in that a perforated jacket surrounding the receiving space all round is disposed within the vessel, spaced from the wall thereof by a short distance, and a supply pipe for steam opens into the space present between the wall of the vessel and the jacket.

2. A steam peeling device according to claim 1, characterised in that said axis of rotation extends at least substantially perpendicularly to the longitudinal axis of the elongated vessel.

3. A steam peeling device according to claim 1, characterised in that the opening of the steam supply pipe is located opposite a massive buffer plate disposed in said perforated jacket.

4. A steam peeling device according to claim 1, characterised in that said jacket extends substantially along the entire length of the vessel.

5. A device according to claim 1, characterised in that a grid for supporting the products to be processed is disposed in said jacket at some distance from the end wall.

6. A steam peeling device according to any one of the preceding claims, characterised in that a partition plate which is fixed to the inner wall of the vessel is disposed in the vessel, between the end of the vessel comprising the end wall and the substantially horizontal axis of rotation, in the central portion of which partition plate a passage is formed, whilst means for removing condensate are provided, which means communicate with the space between the end wall and the partition plate, wherein the device includes a valve mechanism, which shuts off the passage in the central portion in a first position and which releases said passage in a second position so as to place the space between the end wall and the partition plate into open communication with the other part of the interior of the vessel.

7. A steam peeling device according to claim 6, characterised in that one end of an annular supporting member is mounted in the passage in the partition plate and the other end of said supporting member is attached to the end wall of the vessel, whilst said annular supporting member accommodates a housing that movably supports a valve rod carrying a valve, and said annular supporting member also supports a valve seat that mates with said valve, whilst said housing and said annular supporting member are provided with passages which are in open communication with the space between the end wall of the vessel and the partition.

8. A steam peeling device according to claim 6, characterised in that a discharge pipe fitted with a shut-off valve is connected to the space between the end wall of the vessel and the partition plate, which discharge pipe connects the space between the end wall of the vessel and the partition plate to the interior of a hollow shaft that supports the vessel, which shaft is rotatable in an annular member surrounding said shaft, to which a further discharge pipe is connected, which communicates with the interior of said hollow shaft via passages in said hollow shaft and a passage in said annular member.

9. A device according to claim 8, characterised in that said hollow shaft surrounds a steam pipe, which is surrounded by a strengthening layer at the location where the discharge pipe is connected to the hollow shaft.

10. A steam peeling device according to claim 2, characterised in that the opening of the steam supply pipe is located opposite a massive buffer plate disposed in said perforated jacket.

11. A steam peeling device according to claim 2, characterised in that said jacket extends substantially along the entire length of the vessel.

12. A steam peeling device according to claim 3, characterised in that said jacket extends substantially along the entire length of the vessel.

13. A steam peeling device according to claim 10, characterised in that said jacket extends substantially along the entire length of the vessel.

14. A device according to claim 2, characterised in that a grid for supporting the products to be processed is disposed in said jacket at some distance from the end wall.

15. A device according to claim 3, characterised in that a grid for supporting the products to be processed is disposed in said jacket at some distance from the end wall.

16. A device according to claim 10, characterised in that a grid for supporting the products to be processed is disposed in said jacket at some distance from the end wall.

17. A device according to claim 4, characterised in that a grid for supporting the products to be processed is disposed in said jacket at some distance from the end wall.

18. A device according to claim 11, characterised in that a grid for supporting the products to be processed is disposed in said jacket at some distance from the end wall.

19. A device according to claim 12, characterised in that a grid for supporting the products to be processed is disposed in said jacket at some distance from the end wall.

20. A device according to claim 13, characterised in that a grid for supporting the products to be processed is disposed in said jacket at some distance from the end wall.

* * * * *